(12) United States Patent
Cook

(10) Patent No.: US 6,455,869 B1
(45) Date of Patent: Sep. 24, 2002

(54) MOTORCYCLE WHEEL LIFT

(76) Inventor: Robert L. Cook, 6710 N. Elm, Big Rapids, MI (US) 49307

( * ) Notice: Subject to any disclaimer, the term of this patent is extended or adjusted under 35 U.S.C. 154(b) by 0 days.

(21) Appl. No.: 10/041,925

(22) Filed: Jan. 7, 2002

(51) Int. Cl.[7] .................................................. B60P 1/48
(52) U.S. Cl. ...................... 257/7 B; 257/8 B; 257/131; 257/133; 257/126
(58) Field of Search ................................ 254/7 B, 7 R, 254/8 B, 8 R, 124, 126, 131, 133

(56) References Cited

U.S. PATENT DOCUMENTS

| | | |
|---|---|---|
| 2,906,497 A | 9/1959 | Wolf |
| 4,118,010 A | 10/1978 | Hanscom |
| 4,460,158 A | 7/1984 | Chiesa et al. |
| 4,548,387 A | 10/1985 | Saccoccia |
| 4,899,985 A | 2/1990 | Good |
| 6,050,546 A | 4/2000 | Peschmann et al. |
| 6,164,625 A | 12/2000 | Shockley et al. |

*Primary Examiner*—Robert C. Watson
(74) *Attorney, Agent, or Firm*—Price, Heneveld, Cooper, DeWitt & Litton

(57) ABSTRACT

A vehicle wheel lift includes a base, a substantially upright member, a linear actuator, and a lift arm. The linear actuator is coupled to the upright member, which is attached to and extends from the base. The lift arm is pivotally coupled to the upright member proximate a first end of the lift arm and above the linear actuator. The lift arm includes a wheel cradle shaped for receiving a vehicle wheel proximate a second end of the lift arm that is opposite the first end of the lift arm and is connected to a ram of the linear actuator between the first and second ends of the lift arm.

20 Claims, 2 Drawing Sheets

MOTORCYCLE WHEEL LIFT

BACKGROUND OF THE INVENTION

The present invention is generally directed to a lift and, more specifically, to a vehicle wheel lift.

At various times it is necessary to remove a wheel from a vehicle in order to perform maintenance on the vehicle and/or maintenance on the vehicle wheel. For example, when a motorcycle tire is flat, the motorcycle wheel must be removed from the motorcycle such that a motorcycle tire and/or inner tube can be repaired or replaced. In a typical situation, when a wheel is to be removed from a motorcycle the motorcycle is placed on a jack stand, which elevates the motorcycle wheels off of the ground. Once a wheel of the motorcycle is lifted off the ground, an individual after removing the wheel must lower the wheel to the ground. Further, after maintenance has been performed on the motorcycle or the wheel, e.g., a tire and/or inner tube has been replaced or repaired, the wheel must generally be lifted up to be replaced on the motorcycle. This requires the individual to both lift the wheel into place and secure the wheel to the motorcycle while holding the wheel in place, which can be physically difficult for the individual. Further, when replacing or removing wheels from other vehicles, e.g., tractor-trailers, the task may be even more difficult as such wheels are generally considerably heavier than motorcycle wheels.

Thus, what is needed is a practical vehicle wheel lift that allows an individual to more readily remove/secure a vehicle wheel from/to a vehicle.

SUMMARY OF THE INVENTION

The present invention is directed to a vehicle wheel lift that includes a base, a substantially upright member, a linear actuator, and a lift arm. The linear actuator is coupled to the upright member, which is attached to and extends from the base. The lift arm is pivotally coupled to the upright member proximate a first end of the lift arm and above the linear actuator. The lift arm includes a wheel cradle shaped for receiving a vehicle wheel proximate a second end of the lift arm that is opposite the first end of the lift arm and is connected to a ram of the linear actuator between the first and second ends of the lift arm.

In one embodiment, the wheel cradle is semi-circular. In another embodiment, the base includes a plurality of casters attached to and extending from a lower surface of the base. In yet another embodiment, the linear actuator includes one of a hydraulic cylinder, a pneumatic cylinder and a screw jack. The screw jack may be one of a manually actuated screw jack or an electrically actuated screw jack.

In still another embodiment, the base is substantially u-shaped and includes a base mounting plate with apertures aligned in a base pattern for receiving mounting bolts for attaching the base to the upright member, which includes an upright member mounting plate with apertures aligned to match the base pattern. In yet another embodiment, the upright member is inclined rearward from an opening of the u-shaped base.

Other objects, advantages and features of the invention will become apparent upon a consideration of the following detailed description, when taken in conjunction with the accompanying drawings. The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto.

In this respect, before explaining the preferred embodiment of the disclosure in detail, it is to be understood that the disclosure is not limited in its application to the details of the construction and the arrangements set forth in the following description or illustrated in the drawings. The motorcycle wheel lift of the present disclosure is capable of other embodiments and of being practiced and carried out in various ways. Also, it is to be understood that the phraseology and terminology employed herein are for description and not limitation. Where specific dimensional and material specifications have been included or omitted from the specification or the claims, or both, it is to be understood that the same are not to be incorporated into the appended claims.

As such, those skilled in the art will appreciate that the conception, upon which this disclosure is based, may readily be used as a basis for designing other structures, methods, and systems for carrying out the several purposes of the present invention. It is important, therefore, that the claims are regarded as including such equivalent constructions as far as they do not depart from the spirit and scope of the present invention.

Further, the purpose of the Abstract is to enable the U.S. Patent and Trademark Office and the public generally, and especially the scientists, engineers and practitioners in the art who are not familiar with the patent or legal terms of phraseology, to learn quickly from a cursory inspection the nature and essence of the technical disclosure of the application. Accordingly, the Abstract is intended to define neither the invention nor the application, which is only measured by the claims, nor is it intended to be limiting as to the scope of the invention in any way.

These and other objects, along with the various features and structures that characterize the invention, are pointed out with particularity in the claims annexed to and forming a part of this disclosure. For a better understanding of the motorcycle wheel lift of the present disclosure, its advantages and the specific objects attained by its uses, reference should be had to the accompanying drawings and descriptive matter in which there are illustrated and described the preferred embodiments of the invention.

While embodiments of the motorcycle wheel lift are herein illustrated and described, it is to be appreciated that various changes, rearrangements and modifications may be made therein, without departing from the scope of the invention as defined by the appended claims.

DETAILED DESCRIPTION OF THE PREFERRED EMBODIMENTS

The present invention is generally directed to a vehicle wheel lift that includes a lift arm that is pivotally coupled, proximate a first end of the lift arm, to a substantially upright member, which is attached to and extends from a base. The lift arm is raised and lowered by a linear actuator that is pivotally coupled to the upright member at a point below the first end of the lift arm and coupled to the lift arm at a point between the first end and a second end of the lift arm. The lift arm includes a wheel cradle shaped (e.g., as a truncated circle or a semicircle) for receiving a vehicle wheel that is proximate the second end of the lift arm, which is opposite the first end of the lift arm. In this manner, the linear actuator can be actuated to raise or lower a vehicle wheel thus allowing an operator to more easily position the vehicle wheel for attachment to or removal from a vehicle.

Figure 1:
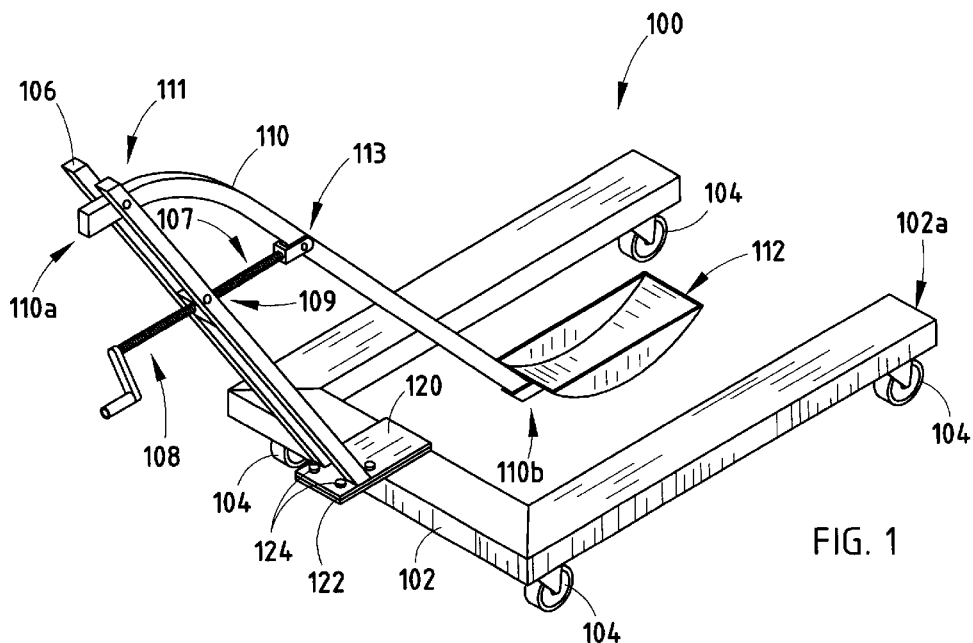
FIG. 1 is a perspective view of a vehicle wheel lift, according to one embodiment of the present invention.

FIG. 1 depicts a vehicle lift 100, according to one embodiment of the present invention. The lift 100 includes a base 102 that includes a plurality of casters 104 that are attached (e.g., welded or bolted) to a lower surface 102a of the base 102. As shown in FIG. 1, the base 102 also includes a base mounting plate 122 that is attached (e.g., welded) to an upper surface of the base 102. The base mounting plate 122 includes a plurality of apertures 124 that are arranged in a base pattern for receiving mounting bolts for attaching the base 102 to a substantially upright member 106. As shown, the upright member 106 includes two parallel beams that are joined (e.g., welded) to an upright member mounting plate 120, which includes apertures aligned to match the base pattern of the base mounting plate 122. Alternatively, the two parallel beams of the upright member 106 may be directly fastened (e.g., welded) to the base 102.

A lift arm 110 is pivotally coupled (e.g., by a bolt or pin that is accepted by apertures in the two parallel beams and the lift arm 110) 111 to the upright member 106 proximate an end opposite the plate 120 of the upright member 106. The linear actuator 108 is also pivotally coupled (e.g., by a threaded mounting block that includes ears, which are received by apertures in the upright member 106, or by a threaded mounting block that includes threaded apertures for receiving bolts provided through apertures in the two parallel beams) 109 to the upright member 106 and coupled (e.g., pivotally while allowing rotation of threaded ram 107) at point 113 to the lift arm 110 between a first end 110a and a second end 110b of the lift arm 110. As shown, the lift arm 110 preferably includes a curved section proximate the first end 110a.

The lift arm 110 includes a wheel cradle 112, e.g., fashioned in the shape of a truncated circle with side walls, attached proximate a second end 110b of the lift arm 110. The wheel cradle 112 of the lift arm 110 is raised or lowered by manual actuation of the threaded ram 107 of the linear actuator (i.e., a manually actuated screw jack) 108. For example, to raise the wheel cradle 112 an operator of the lift 100 would turn the handle of the linear actuator 108 in a clockwise direction and to lower the wheel cradle 112 the operator would turn the handle of the linear actuator 108 in a counter-clockwise direction.

As is shown in FIG. 1, the base 102 is generally u-shaped such that the wheel cradle 112 can be readily brought into place for supporting a vehicle wheel. The upright member 106, as shown in FIG. 1, is inclined rearward from the opening of the u-shaped base 102. However, it should be appreciated that the upright member 106 can be perpendicular with respect to the base 102 or may be positioned rearward or forward within a range of angles (e.g., zero to twenty-five degrees). The lift 100 is preferably constructed of a metal (e.g., steel) whose grade and configuration is chosen with regard to an application specific lifting requirement.

Figure 2:
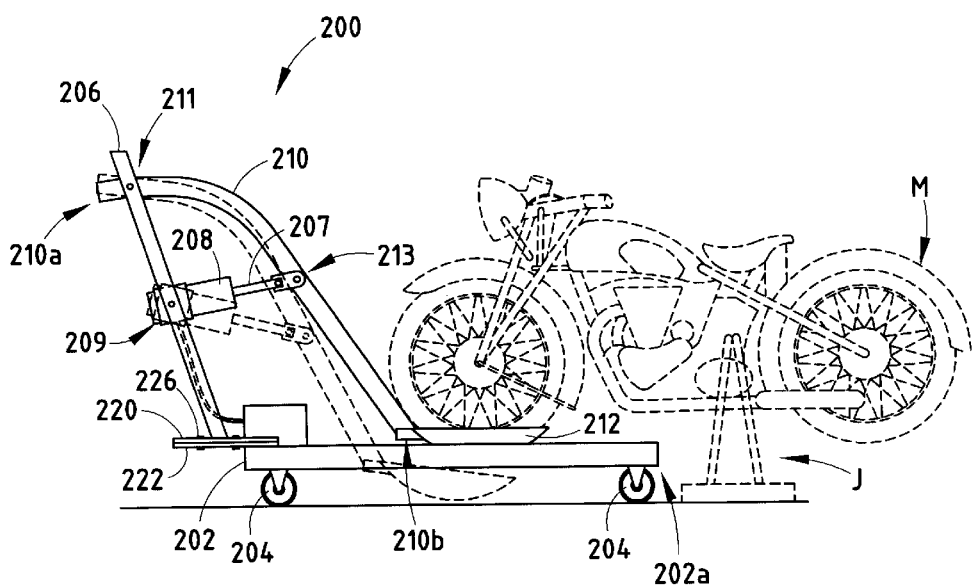
FIG. 2 is a side view of a vehicle wheel lift that is engaged with a motorcycle wheel, according to another embodiment of the present invention.

FIG. 2 depicts a vehicle wheel lift 200, according to another embodiment of the present invention, which is configured in a similar manner to the lift 100 of FIG. 1. As is shown in FIG. 2, the wheel lift 200 is used to remove a wheel from a motorcycle M that is located on a jack stand J. A substantially upright member 206 is attached to and extends from a base 202. A linear actuator 208 is pivotally coupled 209 to the upright member 206 and a lift arm 210 is pivotally coupled 211 to the upright member 206 proximate a first end 210a of the lift arm 210 and at a point that is above the linear actuator 208. The lift arm 210 includes a wheel cradle 212 shaped for receiving a vehicle wheel proximate a second end 210b of the lift arm 210 that is opposite the first end 210a of the lift arm 210. A ram 207 of the linear actuator 208 is connected (e.g., pivotally) to the lift arm 210 between the first end 210a and the second end 210b. The linear actuator 208 may be, for example, a hydraulic cylinder or a pneumatic cylinder. Upon actuation of a control arm (not shown), the linear actuator 208 responds by extending or retracting the ram 207 such that the lift arm 210 is pivoted about the pivot point 211 and, thus, the wheel cradle 212 is raised or lowered.

Figure 3:
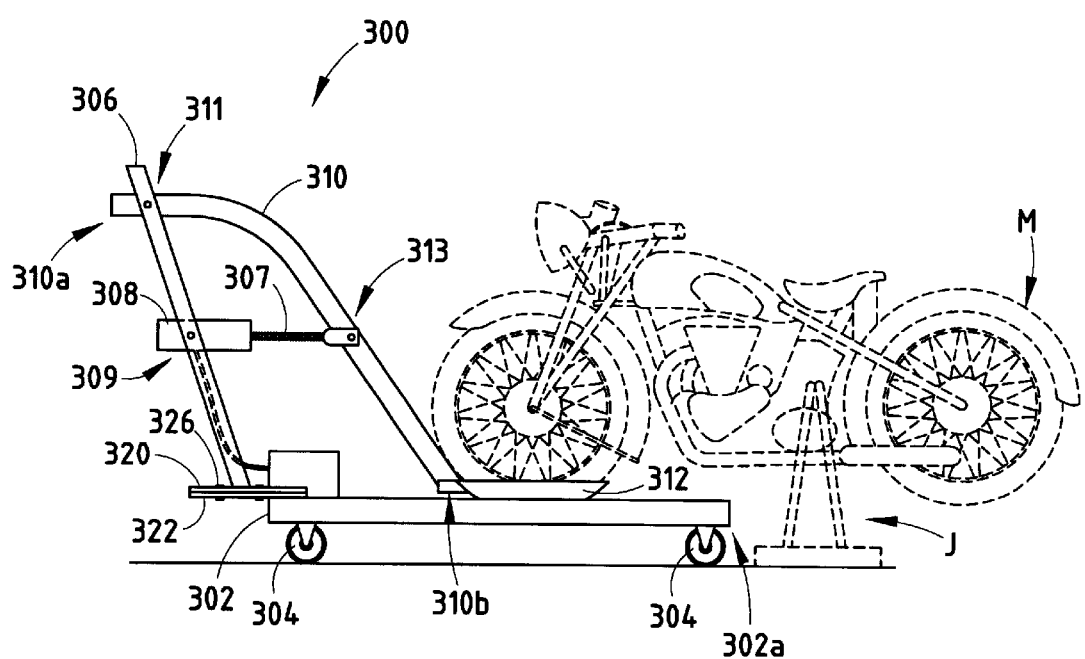
FIG. 3 is a side view of a vehicle wheel lift engaging a motorcycle wheel, according to yet another embodiment of the present invention.

FIG. 3 depicts a vehicle wheel lift 300, according to yet another embodiment of the present invention. The wheel lift 300 is similar to the wheel lifts of FIGS. 1 and 2 with the exception that the linear actuator 308 is an electrically actuated screw jack. As shown in FIG. 3, the lift 300 is wheeled into position at which point the linear actuator 308 is actuated to bring the wheel cradle 312 into contact with a wheel of the motorcycle M, which is located on a jack stand J, which elevates the wheels of the motorcycle M above ground level. The lift 300 includes a base 302 that is substantially u-shaped and includes a plurality of casters 304 attached to a lower surface 302a of the base 302.

The base 302 includes a base mounting plate 322 that has a plurality of apertures, which align with a plurality of apertures in an upright member mounting plate 320 that is attached to a lower end of a substantially upright member 306. The apertures in the plates 320 and 322 receive mounting bolts 326, which are utilized to attach the plate 320 to the plate 322. Alternatively, the upright member 306 can be permanently attached to the base 302 by, for example, welding the plate 320 to the plate 322. The linear actuator 308, which includes a threaded ram 307, is pivotally coupled 309 to the upright member 306. An end of the ram 307 is coupled (e.g., pivotally to allow threaded ram 307 to rotate) 313 to a lift arm 310. The lift arm 310 is pivotally coupled to the upright member 306 proximate a first end 310a of the lift arm 310 and above the linear actuator 308. The lift arm 310 includes a wheel cradle 312 shaped for receiving a vehicle wheel proximate a second end 310b of the lift arm 310 that is opposite the first end 310a of the lift arm 310. As shown in FIG. 3, the linear actuator 308 is an electrically actuated screw jack (i.e., an electric motor including a rotary-to-linear motion converter) that extends and retracts the ram 307.

It should be appreciated that the vehicle wheel lifts shown in FIGS. 1–3 may be utilized on wheeled vehicles other than motorcycles. For example, the vehicle wheel lifts of FIGS. 1–3 can be configured to assist an individual in removing a vehicle wheel from a tractor-trailer or an automobile. Accordingly, a vehicle wheel lift has been described herein that advantageously allows an individual to more easily remove/install a vehicle wheel from/on a vehicle.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A vehicle wheel lift, comprising:
   a base;
   a substantially upright member attached to and extending from the base;
   a linear actuator pivotally coupled to the upright member; and
   a lift arm pivotally coupled to the upright member proximate a first end of the lift arm and above the linear actuator, wherein the lift arm includes a wheel cradle shaped for receiving a vehicle wheel proximate a second end of the lift arm that is opposite the first end of the lift arm, and wherein the lift arm is connected to a ram of the linear actuator between the first and second ends of the lift arm.

2. The wheel lift of claim 1, wherein the wheel cradle is semi-circular.

3. The wheel lift of claim 1, wherein the base includes a plurality of casters attached to and extending from a lower surface of the base.

4. The wheel lift of claim 1, wherein the linear actuator includes one of a hydraulic cylinder., a pneumatic cylinder and a screw jack.

5. The wheel lift of claim 4, wherein the screw jack is one of a manually actuated screw jack and an electrically actuated screw jack.

6. The wheel lift of claim 1, wherein the base is substantially u-shaped and includes a base mounting plate with apertures aligned in a base pattern for receiving mounting bolts for attaching the base to the upright member, and wherein the upright member includes an upright member mounting plate with apertures aligned to match the base pattern.

7. The wheel lift of claim 6, wherein the upright member is inclined rearward from an opening of the u-shaped base.

8. A vehicle wheel lift, comprising:
   a base;
   a substantially upright member attached to and extending from the base;
   a linear actuator pivotally coupled to the upright member; and
   a lift arm pivotally coupled to the upright member proximate a first end of the lift arm and above the linear actuator, wherein the lift arm includes a semi-circular wheel cradle for receiving a vehicle wheel proximate a second end of the lift arm that is opposite the first end, and wherein the lift arm is connected to a ram of the linear actuator between the first and second ends of the lift arm.

9. The wheel lift of claim 8, wherein the base includes a plurality of casters attached to and extending from a lower surface of the base and the upright member is attached to an upper surface of the base.

10. The wheel lift of claim 8, wherein the linear actuator includes one of a hydraulic cylinder, a pneumatic cylinder and a screw jack.

11. The wheel lift of claim 10, wherein the screw jack is one of a manually actuated screw jack and an electrically actuated screw jack.

12. The wheel lift of claim 8, wherein the base is substantially u-shaped and includes a base mounting plate with apertures aligned in a base pattern for receiving mounting bolts for attaching the base to the upright member, and wherein the upright member includes an upright member mounting plate with apertures aligned to match the base pattern.

13. The wheel lift of claim 12, wherein the upright member is inclined rearward from an opening of the u-shaped base.

14. A vehicle wheel lift, comprising:
   a substantially u-shaped base;
   a substantially upright member attached to and extending from an upper surface of the base, wherein the upright member is inclined rearward from an opening of the u-shaped base;
   a linear actuator pivotally coupled to the upright member; and
   a lift arm pivotally coupled to the upright member proximate a first end of the lift arm, wherein the lift arm includes a semi-circular wheel cradle for receiving a vehicle wheel at a second end of the lift arm that is opposite the first end of the lift arm, and wherein the lift arm is connected to a ram of the linear actuator between the first and second ends of the lift arm.

15. The wheel lift of claim 14, wherein the base includes a plurality of casters attached to and extending from a lower surface of the base.

16. The wheel lift of claim 14, wherein the linear actuator includes one of a hydraulic cylinder, a pneumatic cylinder and a screw jack.

17. The wheel lift of claim 16, the screw jack is one of a manually actuated screw jack and an electrically actuated screw jack.

18. The wheel lift of claim 14, wherein the base includes a base mounting plate with apertures aligned in a base pattern for receiving mounting bolts for attaching the base to the upright member, and wherein the upright member includes an upright member mounting plate with apertures aligned to match the base pattern.

19. A motorcycle wheel lift for facilitating the changing of wheels of a motorcycle, wherein the motorcycle is placed on a stand which raises the wheels of the motorcycle off the ground, the lift comprising:
   a substantially u-shaped base;
   a substantially upright member attached to and extending from the base, wherein the upright member is inclined rearward from an opening of the u-shaped base;
   a linear actuator pivotally coupled to the upright member; and
   a lift arm pivotally coupled to the upright member proximate a first end of the lift arm and above the linear actuator, wherein the lift arm includes a truncated circular wheel cradle for receiving one of the motorcycle wheels at a second end of the lift arm that is opposite the first end of the lift arm, and wherein the lift arm is connected to a ram of the linear actuator between the first and second ends of the lift arm.

20. The wheel lift of claim 19, wherein the truncated circular wheel cradle is substantially semi-circular.

* * * * *